METHOD OF APPLYING EDGE VENEERS TO THE EDGE OF PANELS

Original Filed July 26, 1948 3 Sheets-Sheet 1

INVENTOR
FRANK M. CURRAN
JAMES D. QUIST
HENRY C. GEEN
BY Lorrance and Van Antwerp
ATTORNEYS

METHOD OF APPLYING EDGE VENEERS TO THE EDGE OF PANELS

Original Filed July 26, 1948 3 Sheets-Sheet 2

INVENTOR
FRANK M. CURRAN
JAMES D. QUIST
HENRY C. GEEN
BY Liverance and Van Antwerp
ATTORNEYS

METHOD OF APPLYING EDGE VENEERS TO THE EDGE OF PANELS

Original Filed July 26, 1948 3 Sheets-Sheet 3

INVENTOR
FRANK M. CURRAN
JAMES D. QUIST
HENRY C. GEEN
BY Livernois and Van Antwerp
ATTORNEYS Reissued Nov. 11, 1952

Re. 23,572

UNITED STATES PATENT OFFICE 23,572

METHOD OF APPLYING EDGE VENEERS TO THE EDGE OF PANELS

Frank M. Curran and Henry C. Geen, Grand Rapids, Mich., and James D. Quist, deceased, late of Grand Rapids, Mich., by Frank M. Curran and Henry C. Geen, Grand Rapids, Mich., assignees Original No. 2,565,952, dated August 28, 1951, Serial No. 40,654, July 26, 1948. Application for reissue August 11, 1952, Serial No. 303,846

10 Claims. (Cl. 154—116)

Matter enclosed in heavy brackets [ ] appears in the original patent but forms no part of this reissue specification; matter printed in italics indicates the additions made by reissue.

This invention relates to an edge veneer machine or apparatus for the glue attachment of veneers at the edges of panels. Such panels are used in large quantities in furniture manufacture, particularly for table tops, desk tops, and similar tops of other furniture, the top consisting of a core usually with veneer glued to the upper and lower horizontal sides thereof, and at the edges the edge veneers which are to be attached by the machine of our invention are glued.

Heretofore the veneering of panel edges has been generally in accordance with two methods. One uses animal glue with the edge veneering pressed against the edges of the panel by use of a hand operated screw clamp. The other method involves rubbing on the veneer to the panel edge, also using animal glue. With both methods and with the equipment used it is impossible to apply or secure an absolutely uniform pressure at all portions of the edges being veneered, so that a percentage of panels are poorly glued; and the defective panels must be repaired by regluing. Further, such methods involve a great deal of hand labor for a proper veneering of the edges, as the edges are veneered individually, one at a time, with a resultant high cost. Additionally, the animal glue which is used because it is considered the best glue which will perform adequately with such old methods and because it has a quicker setting time than the other glues, is subject to the absorption of moisture, therefore the glued joints are weak with respect to water or exposure resistance.

With our invention the shortcomings mentioned have been overcome. A uniform pressure over the entire areas being glued is attained, regardless of deviations in machining or variations from a true plane surface. There is a uniform heat application to all areas being glued, therefore water resistant resin glues may be and are practically used, and with our invention, a plurality of panels are processed and the edge veneers secured in place simultaneously with an elimination of a great amount of the previously necessary hand labor. The joints produced are uniform and are of the same high quality throughout, this being proven in the actual use of this machine by the attainment of a rejection rate for poor gluing which is far lower than that with the older methods previously mentioned.

Figure 1:
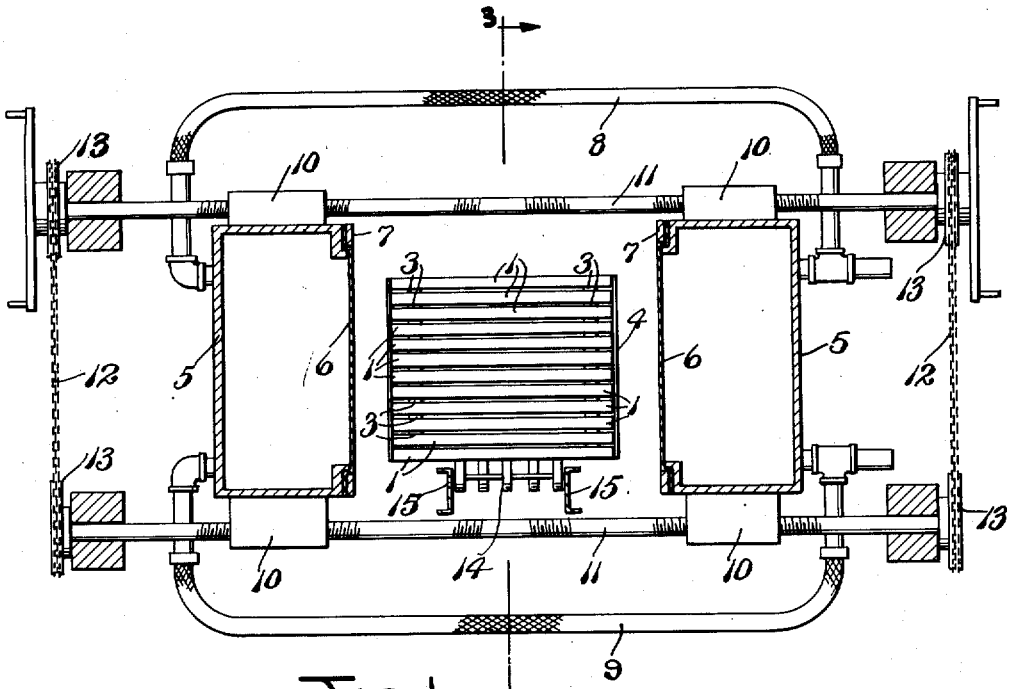
Figure 2:
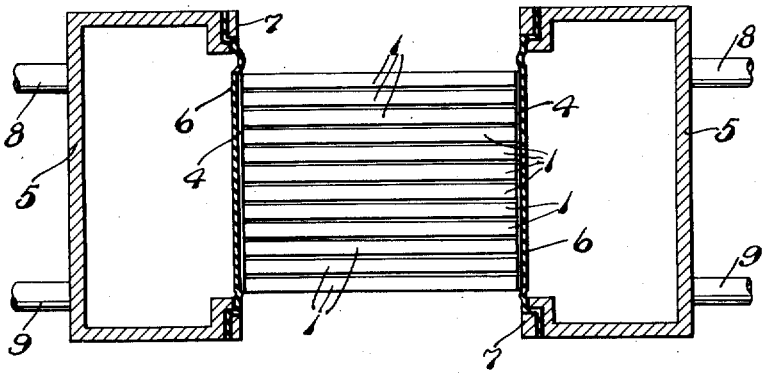
Figure 3:
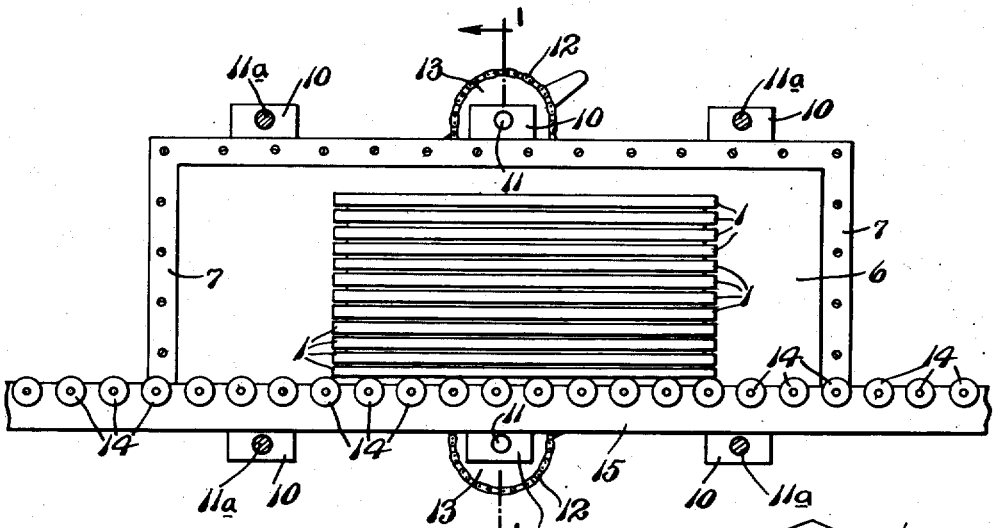

We attain all of these advantages and better results by our invention, which may be understood from the following description, taken in connection with the accompanying drawings, in which, Fig. 1 is a transverse vertical section through the machine, substantially on the plane of line 1—1 of Fig. 3, Fig. 2 is a fragmentary enlarged section, as shown in Fig. 1, showing the position of the edge veneer pressure and heating members, while the process of edge veneer securing is being performed, as distinguished from that shown in Fig. 1 in which a plurality of panels may be moved to position between said pressure and heating members.

Figure 4:
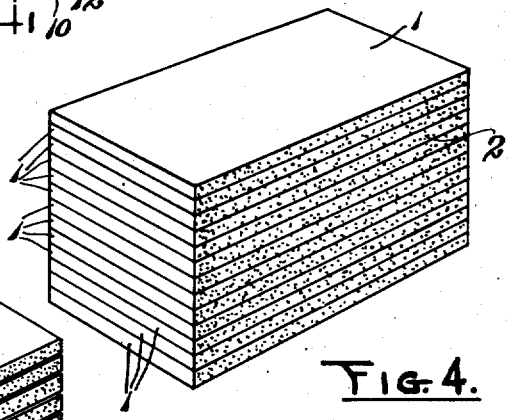
Figure 5:
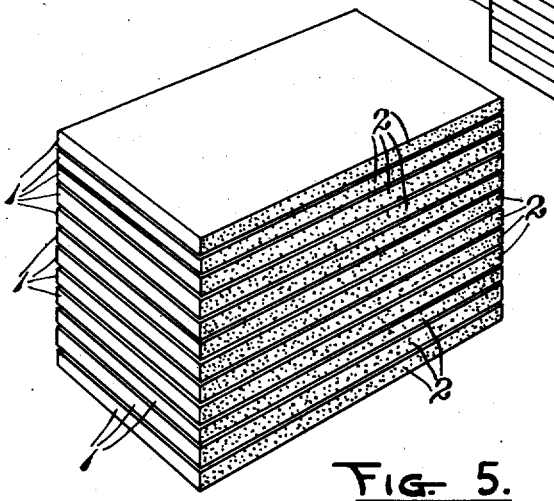
Figure 7:
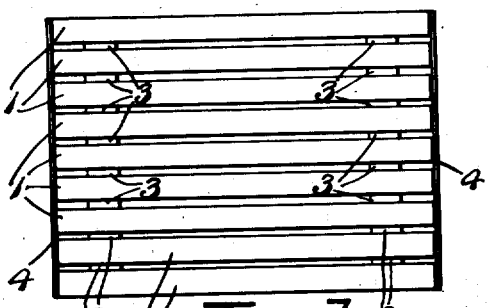
Figure 6:
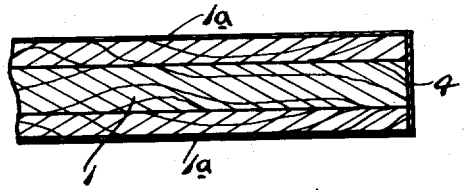

Fig. 3 is a longitudinal vertical section, substantially on the plane of line 3—3 of Fig. 1, Fig. 4 is a perspective view showing the first step of the process which is followed, that is, stacking a plurality of the panels one over the other for glue application at a common edge of all of them, or at opposed edges thereof, Fig. 5 is a perspective view illustrating the second step of the method used, or the separation of the panels to which the glue has previously been applied, so as to space them from each other, Fig. 6 is a fragmentary enlarged section at an edge portion of the panel showing the upper and lower veneers thereon and the edge veneer after its application, Fig. 7 is an end elevation of the spaced panels of Fig. 5 with veneer sheets at opposed edges of the panels to which edges the edge veneers are to be attached.

Figure 8:
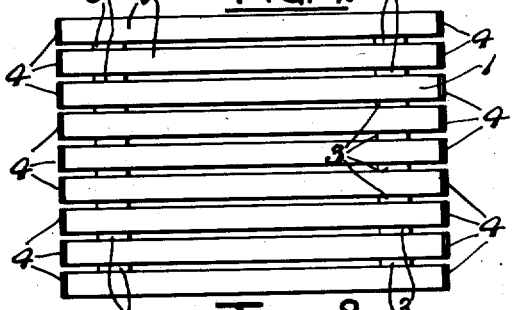

Fig. 8 is a similar end elevation of the several panels with portions of the veneer sheets between adjacent panels cut away to separate said panels and leave them with edge veneers attached.

Figure 9:
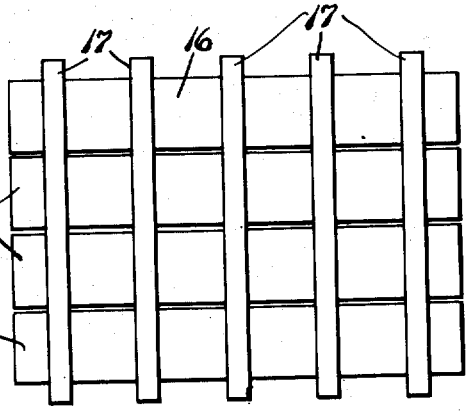
Figure 10:
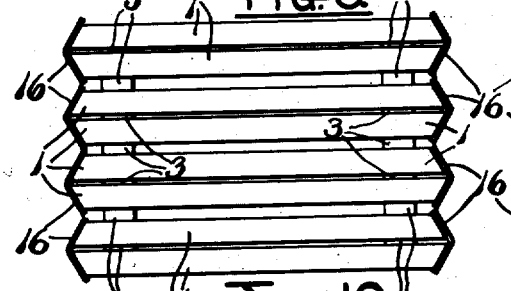
Figure 11:
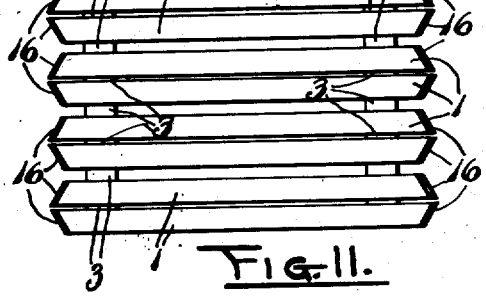

Fig. 9 is an elevation of a plurality of edge veneer strips held together in parallel relation by transverse tapes which may be used in some edge gluing operations, and Figs. 10 and 11 are end elevations similar to Figs. 7 and 8 of a variation in the method followed where the edges which are to have veneer strips glued thereon are at an angle other than a right angle to the upper and lower sides of the panels.

Like reference characters refer to like parts in the different figures of the drawings, and the sections are taken looking in the directions indicated by the arrows associated with the section lines.

A plurality of the panels 1, each of which may have a veneer covering 1a applied and securely glued at its upper and lower sides, are stacked one over the other as shown in Fig. 4, and the common edges of the panels where edge veneering is to be glued, are coated at such edges with glue as indicated at 2. In general, with a machine of our invention the opposite edges will be glue coated, as with our invention the edge veneers may be applied simultaneously at opposite sides of the stack of panels.

The panels 1 after the glue at an edge 2 of each or at opposite edges has been applied, are separated from each other by strips 3 which extend, preferably, parallel to the glued edges. At each of the plurality of edges 2 to which the glue has been applied, a veneer sheet 4 is pressed against the glue and temporarily held in place as by adhesive tape so that a unit, comprising a plurality of the panels 1 spaced from each other by the spacers 3 and with the glue sheets 4 at opposite sides, may be entered into the machine which we have provided, and properly located for the application of heat and pressure to said veneer sheets. The glue, which is preferably of a water resistant resin type, when subjected to heat and pressure sets rapidly. After the application of the heat and pressure for the required period of time, in general approximately five minutes, the processed unit consisting of the plurality of panels is removed from the machine and the veneer sheets 4 by sawing or other equivalent operations, are divided at the spaces between the adjacent panels, producing, as shown in Fig. 8, a plurality of panels the opposite edges of which have the edge veneer firmly and uniformly glue secured thereto. The process may be repeated with respect to the opposed ends of the panels to complete edge veneering around the panels.

The machine includes two steam receiving chambers within a chamber housing 5 having rigid ends, back, top and bottom, and opposite the back a flexible resilient closure 6 of rubber or similar or equivalent material, which has a sealed connection with the housing 5 by means of a clamping frame 7. Steam may be supplied simultaneously to the chambers through an inlet and a flexible connection 8 connecting the upper portions of the chambers, and a like outlet and flexible connection 9 connecting the lower portions of the chambers. Of course, either the inlet or outlet may be interchanged so long as there is a simultaneous entry of the steam under pressure, and after the process cycle is completed, the simultaneous steam exhaust therefrom.

At the upper and lower sides of the chamber housings 5 and transversely thereof, spaced blocks 10 are connected through which rods 11 and 11a pass. The central rod 11 is preferably oppositely threaded at opposite end portions and engages with complementary threads interiorly of the blocks 10 through which the rod passes. This rod is rotatable like a shaft and may be turned manually to move the chamber housings 5 toward or away from each other, and therefore cause the inner resilient sides 6 to approach or move away from each other. The rods 11a pass freely through the other blocks 10 and serve to guide and stabilize the housings 5. Preferably, the upper rod or shaft 11 and the lower shaft 11 are connected by endless chains 12 around sprocket wheels 13 on said shafts for the simultaneous movement of the upper and lower portions of the chamber housings 5.

The housings 5 are adapted to be spaced a sufficient distance apart that a unit of stacked panels 1 spaced by the bars 3 and with veneer sheets 4 at opposite side edges may be entered between them. Rollers 14 mounted on horizontal shafts carried by horizontal frame members 15 in a plane at the lower portions of the chamber housings 5 provide a conveying means for moving one of the panel units into place between the inner resilient sides 6 as in Fig. 1. After proper location with respect to said sides the shafts 11 are rotated to move the resilient rubber sides 6 into contact with the outer sides of the veneer sheets 4 (Fig. 2). Steam under pressure, which pressure may approximate fifty pounds to the square inch, is then entered into the housings 5 and the heat of the steam and the pressure thereof are uniformly applied over the entire outer surfaces of the veneer sheets 4. The resilient members 6 will conform perfectly to the outer surfaces of the sheets 4 irrespective of such variations in the surfaces from perfect planes that there may be, so that there is a uniform pressure applied while the temperature is exactly the same over all portions of the members 6 and therefore to the veneer sheets 4 against which they press.

After the application of the heat and pressure has continued for a period of time, in practice approximately five minutes, the shafts 11 are reversed so as to move the steam receiving chamber housing away from the panels and veneers which have been between their inner resilient sides. The panel unit is removed from the machine and another introduced in its place for a repetition of the process, and the one which has been removed has the veneer sheets 4 cut between the parallel sides of adjacent panels, as in Fig. 8.

When the edges of the panels are not at right angles to the upper and lower sides, but, as shown in Fig. 8, may be inclined at an angle different than a right angle, the glue is applied to the inclined or beveled edges in the same manner and the panels are stacked one over another in pairs, the panels of a pair being reversed in position with respect to each other and separated by relatively thin spacing strips, while the pairs of panels are separated from each other by thicker spacing strips 3 as shown. For each pair of panels a veneer sheet 16 is provided for each of the common edges of the two panels and in number the veneer sheets 16 at a side of a unit are equal to the number of pairs in a stack. Such veneer sheets 16 are secured together in closely spaced relation by paper transverse flexible tapes 17, preferably glued thereto. When pressed against the beveled edges of the panels, the pressure back of the resilient sides 6 of the steam pressure chambers forces the veneers into conformity with such beveled edges and the tapes being flexible will maintain the plurality of veneer sheets 16 in proper position with respect to the edges of the panels to which they are to be secured until said veneer sheets have been longitudinally bent, as shown in Fig. *10* [9] and will not be displaced in position when, upon continuation of the pressure and the complete conformation of the veneer sheets 16 at the edges of a pair of panels, the tapes between adjacent sheets 16 may be ruptured by tension thereon. After the heat and pressure application has continued the required time and the stack of pairs of *panels* [veneers] removed from the machine, the panels of the pairs may be separated by cutting or otherwise dividing the veneer sheets 16 lengthwise between the adjacent sides of each pair of panels which have had the edge veneers glued thereto. Of course, projecting portions of the veneer sheets extending beyond the upper and lower surfaces of a pair of panels may likewise be cut away to remove any projecting edges thereof.

The structure described and the method followed is one of great practical utility. Not only is there insurance that a more uniform product will be obtained with a much smaller percentage of rejections, but the economy in production is much increased.

Having thus described our invention, what we desire to claim and secure by Letters Patent is as follows:

1. The method of applying veneer to the edges of panels which consists in superimposing a plurality of panels one over the other with adjacent panels spaced short distances apart, having glue covering an edge of all of said panels at one side of the superimposed plurality of panels, placing a sheet of veneer against said glued edges to simultaneously cover all of said edges and spaces between the panels, subjecting said veneer sheet to a uniform pressure against said edges and a uniform temperature until the glue is set, and cutting the veneer sheet between the panels to remove the portions thereof over the spaces between the panels.

2. The method of applying veneer coverings to the edges of panels which consists, in stacking a plurality of panels of the same size in superimposed relation one over the other, to provide a unit including the plurality of panels, applying glue to a vertical side of said unit to cover all of the common edges of said panels at said side, separating the panels from each other and holding them spaced vertically from each other short distances, applying a veneer sheet against the glued edges of said panels and over the spaces between the panels at said edges thereof, applying pressure uniformly and heat at a uniform temperature over the entire outer surface of said veneer sheet until the glue is set, and cutting the veneer sheet lengthwise of the panels at the spaces between said panels covered by said veneer sheet to separate the panels with said edge of each of the panels covered by veneer secured thereto.

3. The method defined in claim 2, in which said uniform pressure and uniform temperature applied to the outer side of said veneer sheet consists in placing a member of resilient material of a greater area than the area of said veneer sheet against the outer side of said veneer sheet, and subjecting said resilient member to continuous uniform steam pressure.

4. The herein described method of applying edge veneers to the edges of panels which consists, in stacking a plurality of rectangular panels of the same dimensions one over the other to provide a vertical unit, applying glue to opposite sides of said unit, spacing and holding said panels vertically a short distance from each other, locating one sheet of veneer against each of the opposite sides of said unit to cover the opposite glued edges thereof and the spaces between them, simultaneously applying uniform pressure and heat at a uniform temperature over the entire outer surfaces of both of said veneer sheets until the glue is set, and then cutting the veneer sheets at the spaces between the superimposed panels to separate said panels from each other and to remove portions of said veneer sheets substantially equal to the widths of the spaces between the panels.

*5. The method of applying veneer to the edges of panels which consists, in superimposing a plurality of panels spaced short distances apart, placing a sheet of veneer against the superimposed edges of said panels to simultaneously cover all of said edges and the spaces between the panels, having glue interposed between said panel edges and said veneer, subjecting said veneer sheet to a uniform pressure against said edges and a uniform temperature until the glue is set, and cutting the veneer sheet between the panels to remove the portions thereof over the portions between the panels.*

*6. The method of claim 5 in which said heat and pressure are obtained by means of steam.*

*7. The method of applying veneer to the edges of panels which consists, in superimposing a plurality of panels over one another with adjacent panels spaced short distances apart, placing a sheet of veneer against the superimposed edges of said panels to simultaneously cover all of said edges and the spaces between them, having glue interposed between said panel edges and said veneer, subjecting said veneer to heat and pressure against said edges, said heat and pressure being uniformly distributed over the entire area until the glue is set, and severing the veneer sheet between the panels.*

*8. The method of claim 7 in which said heat and pressure are obtained by means of steam.*

*9. The method of applying veneer to the edges of panels which consists, in superimposing a plurality of panels over one another with adjacent panels spaced short distances apart, placing veneer against the superimposed edges of said panels, having glue interposed between said panel edges and said veneer, and applying heat and pressure against said veneer over the entire area of the panel edges, said heat and pressure being uniformly distributed over said entire area until the glue is set.*

*10. The method of claim 9 in which said heat and pressure are obtained by means of steam.*

*Frank M. Curran and Henry C. Geen assignees of James D. Quist, Deceased.*

FRANK M. CURRAN.
HENRY C. GEEN.

REFERENCES CITED

The following references are of record in the file of this patent or the original patent:

UNITED STATES PATENTS

| Number | Name | Date |
|---|---|---|
| 1,078,776 | Dunton | Nov. 18, 1913 |
| 1,870,517 | Lacey | Aug. 9, 1932 |
| 2,151,880 | Wiederkehr | Mar. 28, 1939 |
| 2,244,282 | Bergstein | June 3, 1941 |
| 2,250,533 | Hanson | July 29, 1942 |
| 2,372,617 | Trew | Mar. 27, 1945 |
| 2,438,615 | Morin | Mar. 30, 1948 |
| 2,445,290 | Gonda | July 13, 1948 |